Jan. 8, 1935.   H. ST. LAURENT   1,986,894
NONREGENERATIVE SYSTEM AND METHOD OF OPERATING THE SAME
Filed July 22, 1931
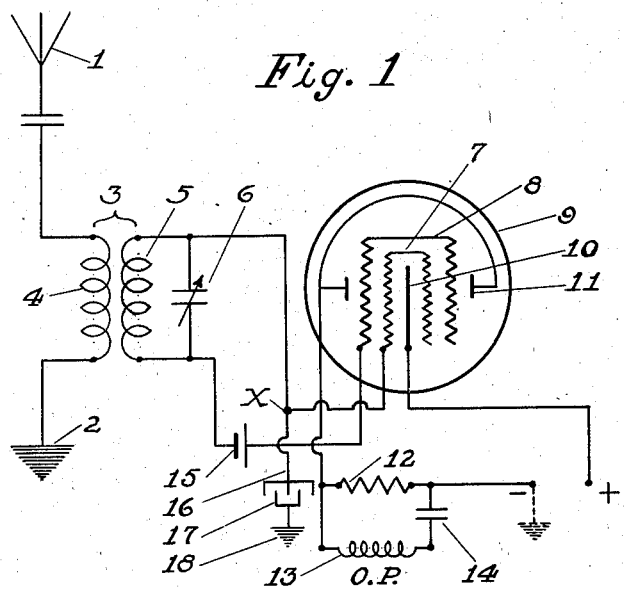
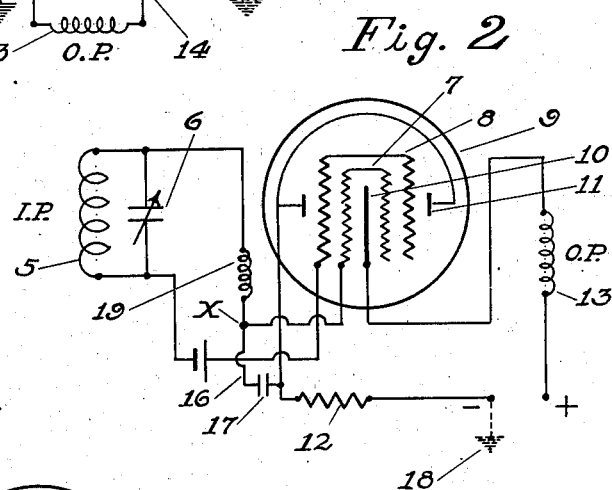
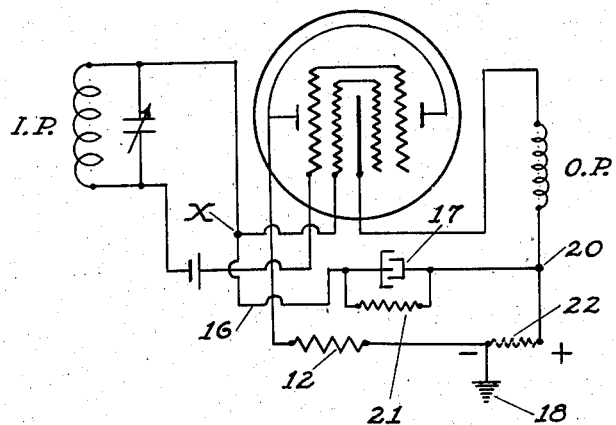
INVENTOR
Herbert St. Laurent
BY Roderick Malcolm.
ATTORNEY Patented Jan. 8, 1935

1,986,894

UNITED STATES PATENT OFFICE 1,986,894

NONREGENERATIVE SYSTEM AND METHOD OF OPERATING THE SAME

Herbert St. Laurent, New Haven, Conn., assignor, by mesne assignments, to Radio Research Laboratories, Inc., a corporation of Delaware Application July 22, 1931, Serial No. 552,363

7 Claims. (Cl. 179—171)

This invention relates to electrical systems for the communication of intelligence, and methods of operating the same, particularly to circuits where regeneration, or oscillation, is not desired, and has special reference to the provision of methods and means in connection with tubes or cells of the type disclosed in co-pending applications of John Allen Heany and Philip M. Haffcke, Serial No. 542,304 and Serial No. 548,410, whereby in relay, amplifying, or modulating circuits the undesirable effects such as may result from a retransfer, or feed-back of energy is avoided.

For certain purposes where it is practical to use regenerative circuits, it is possible to control the building up of, or amplification of, a signal. Such a circuit, including gas cells of the referred to type, is illustrated and described in co-pending joint application of John A. Heany and Herbert St. Laurent, Serial No. 559,214 filed August, 25, 1931.

In certain cases it is not always necessary, or desirable, to utilize the principle of regeneration, and in such cases it is necessary to nullify the effects of a retransfer or feed-back of energy from the output circuit to the input circuit. For instance, in circuits employing vacuum tubes, due to the inherent capacity between the plate and grid, a feed back of energy takes place from the output circuit of the tube to the input circuit. Particularly in radio frequency circuits this "capacity effect," together with the inductances and condensers in the hook-up, embody all the features necessary for the generation of oscillations, with resulting howling noises, distortion of the wave form, and other undesirable conditions.

In circuits utilizing gas tubes of the Heany-Haffcke type, it is unnecessary to resort to means for suppressing capacity feed-back through the tube, because there is no "condenser effect," since the inter-electrode space exhibits conductive, rather than dielectric properties. However, in cells or tubes of this type, the electrodes and gas form a series path through the tube, and in circuits where the resulting retransfer of current from output to input is not desirable, it is possible to adopt certain "losser" arrangements, known to those skilled in the thermionic tube art.

All such expedients, however, are directed to suppressing, rather than removing the current fed back from the output to the input circuit, and at best are very difficult to adjust and merely serve to reduce the very undesirable results of this condition.

A principal object of the present invention is to obviate all such suppressing, neutralizing, or reducing expedients.

Another, and important object of this invention is the provision of a circuit, which shall be free from the undesirable effects, which may be traceable to the regenerative, or oscillatory, condition above described.

Still another object of this invention is to provide a novel and efficient detector and/or amplifier circuit, for use in communication systems, or the like, adapted for use with gaseous tubes, and which will also permit full utilization of the unusual and valuable characteristics of cells of the type disclosed in the above noted cases Nos. 542,304 and 548,410.

With these objects in view, it has been discovered that by using gaseous tubes or cells, for instance of the type described in the above cited applications, it is practical to design and construct circuits which are very sensitive to minute variations in the signal energy, and are entirely free from the undesirable conditions and results traceable to retransfer or feed-back of energy.

Considered from a broad aspect, this invention is predicated upon the discovery that the alternating current component in the output circuit of cells of the gas type may be shunted or tapped at a suitable point in the grid circuit and effectively by-passed from feeding back through the input circuit. This method and arrangement is a radical departure from present anti-regenerative systems, which are all directed to suppressing, rather than removing the unwanted condition.

Other objects and principles of the invention will be apparent and the invention will be more readily understood by reference to the accompanying drawing in which certain particular preferred forms of the invention are shown by way of illustration, but without limiting the invention thereto.

Figure 1 shows a radio receiving circuit to which the invention is applicable.

Figures 2 and 3 are modifications thereof.

All of said figures omit illustrations of other stages of the set, and the couplings between stages, the omission being in the interest of simplicity, it being understood the invention is applicable to hook-ups having any desired number of stages. The invention is intended for use not only in radio circuits shown in Figure 1, but it is equally applicable to telephone and telegraph, as well as in relay circuits, and certain industrial uses.

Referring now to Figure 1, an antenna 1 is connected to a ground conductor 2, through a coupling transformer 3, having a primary winding 4, and a secondary winding. The terminals of secondary winding 5, which are shunted by a tuning condenser 6, are connected respectively to the grid 7 and the cathanode 8 of a gaseous cell 9. The cell or tube 9 comprises an anode 10 and a cathode element 11, in addition to the grid 7 and the cathanode 8. A single energizing source is here designated simply by positive pole + and negative pole —; the necessary ground connection, which may be through the transformer of a power pack, or through the coils thereof, is shown symbolically by the dotted lines. A ballast resistor 12 serves to limit the maximum amount of direct current permitted to pass through the tube.

As will be more particularly pointed out in connection with Figs. 2 and 3, the output coupling from the circuit to the next stage may be at any suitable point. It is entirely practical, for instance, to take the output 13 from across the terminal of ballast resistor 12, in which case one leg of the connection should include a condenser 14. A separate direct current source 15 is shown, although not necessarily, serving as a biasing potential for electrode 7.

The tube 9 is preferably a gas cell of either the "internal cathode type", or of "external cathode type", as shown, and as disclosed in co-pending applications Serial No. 548,410 and Serial No. 542,304.

The construction and operation of the gas cell as disclosed in the applications above cited may be here briefly described as follows: two electrode elements (for instance, elements 8 and 11) constitute the working cathode of the cell. That is, these electrodes may be considered as exciters of apparent electronic emission, the gas within the container being the prime source of electrons. One of these electrode elements (for instance element 8, Figure 1) is positive to the cathode element 11, and is negative to the anode 10. This electrode 8, because of its dual relationship is designated "cathanode." The anode 10 is similar in function to the plate in a thermionic tube, at least it serves to accelerate electrons towards itself, and may be considered as one of the output electrodes. The position and arrangement of grid 7 is analogous to the grid in a thermionic tube, however it is not necessarily the control electrode. In the present embodiment, cathanode 8 is the control electrode, in the sense that it is permitted to "swing free" with the variations in the incoming signal.

A connection 16 from a suitable point X in the grid lead is made to ground 18 through a condenser 17, and serves to effectively by-pass the alternating frequency component, which has been transferred from the plate electrode 10 across the gaseous conducting path to electrode 7, from being retransferred into the tuned input circuit, thereby preventing regeneration, or a possible oscillatory condition. With this arrangement it is unnecessary to resort to so-called "losser" systems to suppress the unwanted current in the input circuit, as the connection 16 to ground 18 through condenser 17 effectively blocks the feed-back of energy to the tuned circuit 5—6.

Figure 2 is similar in many respects to Figure 1, like characters designating similar parts. The input coupling 5 and tuning arrangements 5—6 may be the same, although any suitable means may be employed. The terminals of the secondary winding 5 are, as in Figure 1, connected to cathanode 8 and grid 7; I may, however, connect the grid lead through choke 19. The output 13 is here shown in series with the anode 10 and the positive pole of the energizing source, although, because of the unusual characteristics of the cell here illustrated, it may be at any one of several points in the circuit.

With the "by pass" arrangement here shown it is unnecessary to make use of a separate lead and a separate ground, as in Figure 1. The undesired alternating current component retransferred from the output to the input circuit may be by-passed from connection X through lead 16 and condenser 17 to the cathode lead and through ballast resistor 12 to ground 18.

Figure 3 differs from both Figs. 1 and 2 inasmuch as the by-pass connection 16, instead of being led directly to ground 18, may have the terminal, opposite to X, connected at a convenient point in the + or anode circuit connection, say at 20. The ground circuit for the undesired alternating current component is then to the — pole of the voltage source, which in effect is grounded through the usual arrangement 22 of voltage dividers and condensers in the power pack.

The resistor 21 shunted across condenser 18 it to provide a leak path for preventing the condenser 18 from discharging through the tube.

As many further modifications and changes in details will be apparent to those skilled in the art, without departing from the spirit and scope of my invention, it is to be understood that the foregoing is to be interpreted as illustrative and not in a limiting sense except as required by the appended claims and by the prior art.

What is claimed is:

1. In an electrical system, the combination with a discharge device having an appreciable gas content and having an input circuit, means for ionizing said gas, a source of undesired energy flowing through said gas to said input circuit, of means for diverting the undesired energy from said input circuit.

2. In an electrical system, the combination with a discharge device having an appreciable gas content and having an input circuit, means for ionizing said gas, and an output circuit, of means for diverting from said input circuit, energy fed back through said gas from said output circuit.

3. In an electrical system, the combination with a discharge device having an appreciable gas content and having input electrodes, means for ionizing said gas, tuning means connected between said electrodes, an output electrode, of means for preventing energy fed back from said output electrode to said input electrodes through said gas, from flowing in said tuning means.

4. In an electrical system, the combination with a cold cathode gas cell having a grid-cathanode circuit and an anode-cathode circuit in mutual energy transfer relation, of a circuit including a condenser connected to said grid-cathanode circuit for by-passing energy transferred from said anode-cathode circuit.

5. In an electrical system, the combination with a cold cathode discharge device having an appreciable gas content and having a grid, of a circuit including a condenser connecting said grid to ground.

6. In a system as described the combination comprising a gas discharge device, a plurality of electrodes immersed in the gas of said device, means connected to a pair of said electrodes for ionizing the gas, an input circuit connected between a pair of said electrodes, an output circuit connected between a pair of said electrodes, and a low impedance grounded circuit connected to the input circuit for by-passing energy transferred back from the output circuit to the input circuit through the conducting path of the ionized gas.

7. In a system as described the combination comprising a gas discharge device, a plurality of electrodes immersed in the gas of said device, means connected to a pair of said electrodes for ionizing the gas, an input circuit connected between a pair of said electrodes, an output circuit connected between a pair of said electrodes, a by-pass circuit connecting the input circuit with the means for ionizing the gas for by-passing energy transferred back from the output circuit to the input circuit through the conducting path of the ionized gas.

HERBERT ST. LAURENT.